Nov. 10, 1959  S. A. MASON  2,911,751
SPINNING FISH LURE
Filed Jan. 29, 1958  2 Sheets-Sheet 2
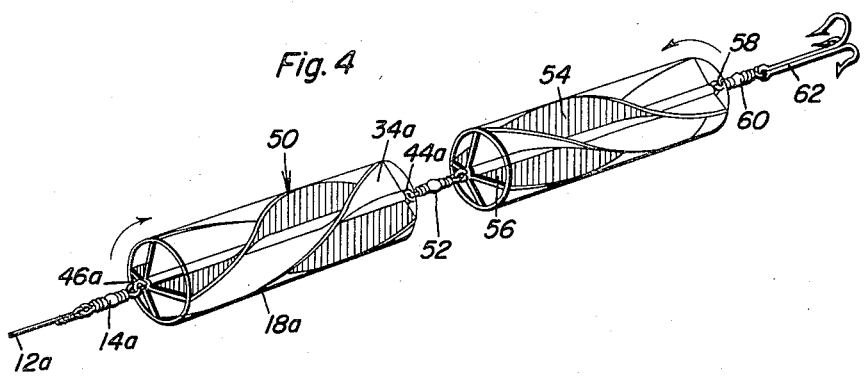
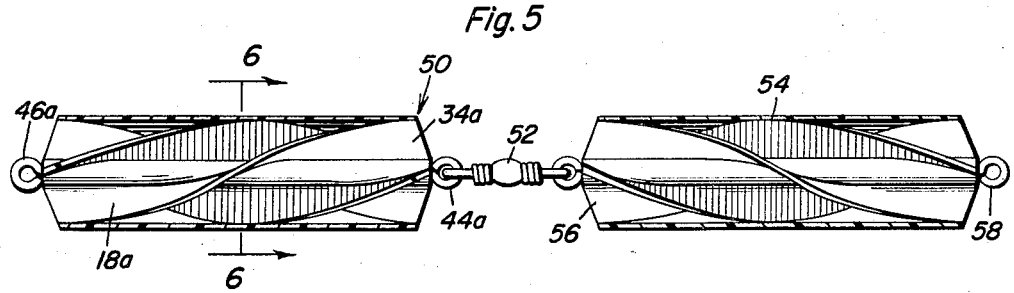
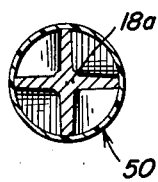
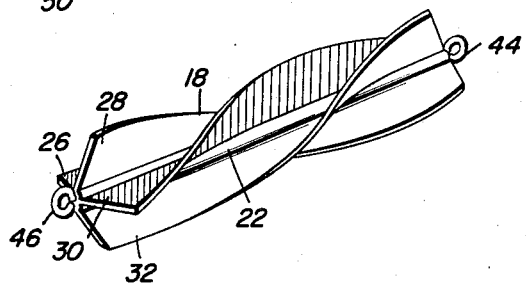
Stanley A. Mason
INVENTOR.
BY Clarence A. O'Brien
and Harvey B. Jackson
Attorneys

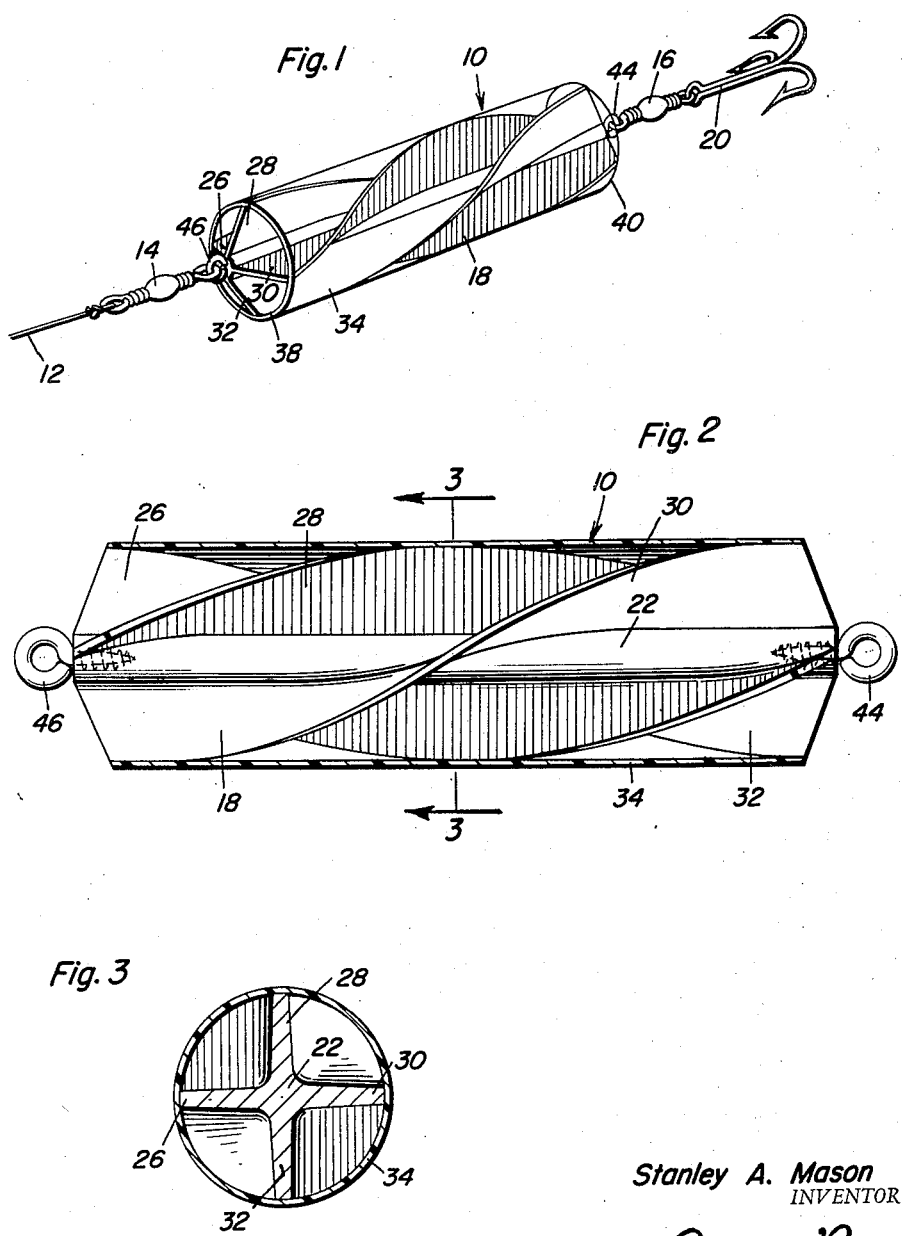

United States Patent Office

2,911,751
Patented Nov. 10, 1959

2,911,751

SPINNING FISH LURE

Stanley A. Mason, Petersburg, Va.

Application January 29, 1958, Serial No. 712,011

1 Claim. (Cl. 43—42.06)

This invention relates to fish lures and more particularly to lures which spin in the water as they are drawn through the water.

Prior spinning lures have been made in single or multiple units, and some have been capable of spinning satisfactorily. An object of this invention is to provide a spinning fish lure which forms a stream of bubbles in the water as it is propelled through the water and which achieves this by the rotation of the lure body. The special construction of the body is of importance in the action of the lure in the water. The body is made of a plurality of vanes radially extending from a longitudinal center line or axis with each vane longitudinally curved from the front to the aft end thereof. It is preferred that the body be enclosed along its sides by an open ended tube of transparent material. This forms an open ended tunnel through which the water is passed as the lure is drawn through the water. A great variety of finishes can be applied to one or more of the vanes causing various illusions and appearances in the use of the lure. The tube not only functions as described above, but also protects the lure body from becoming scarred, bent and the paint from being knocked off of it.

Another object of the invention is to provide a spinning lure that is made of two units connected together at their longitudinal center lines by means of a full, fisherman's swivel. Here again, prior multiple lures have been connected together on a single shaft or a plurality of shafts that are mechanically connected by a universal joint. An improvement is made in this class of lure by having a full swivel connecting the two units. The front unit can rotate in one direction while the rear unit rotates in the other direction and with the two units connected structurally only by the full swivel. A difficulty with prior lures of this general class is bending of the shaft. The full swivel connector completely solves this problem. The two units are connected so that one is articulated with respect to the other and yet, both units can rotate in the same or opposite directions. When drawn through the water the multiple lure leaves a trail of bubbles and provides a fascinating appearance, especially if varigated color schemes are adopted. If the vanes are painted with spiral stripes the lure may appear to be travelling very fast and cause a fish to strike very hard or with a fast forward motion. If painted with stripes spiralling opposite to the turn of the lure it may be made to appear travelling slow and will cause the fish to strike hard or fast as in the first case.

These together with other objects and advantages will become subsequently apparent in following the description that follows:

Figure 1 is a perspective view of a spinning lure constructed in accordance with the invention.

Figure 2 is a longitudinal sectional view of the lure in Figure 1 and on enlarged scale and having the line, hook and means connecting the line and hook to the lure body omitted.

Figure 3 is a transverse sectional view taken on the line 3—3 of Figure 2.

Figure 4 is a perspective view of a multiple lure made of two units and connected together by a full swivel.

Figure 5 is an enlarged longitudinal sectional view of the units of Figure 4.

Figure 6 is a transverse sectional view taken on the line 6—6 of Figure 5.

Figure 7 is a perspective view of the lure body with the open ended tube omitted.

In the accompanying drawings there is a spinning lure 10 which shows one manner of practicing the invention. Lure 10 is show as being connected to a fishing leader 12 by means of swivel 14. The leader and swivel are conventional. Swivel 16 is attached to the aft end of the lure body 18 and supports fish hook 20. Here again, the swivel 16 and hook 20 are conventional.

Lure body 18 (Figure 7) can be of any commonly used material such as wood, plastic, etc. It has an elongated central core or part 22 with four vanes 26, 28, 30 and 32 protruding radially therefrom. Each vane is preferably made of flat stock but which is longitudinally spiralled from the front end to its rear end. To improve the spinning of the lure 10 a thin walled envelope such as tube 34 is placed over the body 18. The tube has an open front end 38 serving as a water entrance and an open rear or after end 40 serving as a water discharge opening. The front edges (see Figure 2) of the four vanes 26, 28, 30 and 32 are slanted rearward in a direction from the center part 22 of the body. Tube 34 functions as a tunnel through which the water passes when the lure is drawn through the water. The four vanes sub-divide the tunnel into four passageways, and as the water moves through these passageways the curvature of the vanes cause the lure body and its tube 34 to rotate in a direction which will depend on the direction of curvature of the vanes.

Eyes 44 and 46 are attached to the center part 22 of the body and on the longitudinal center line of the body. These eyes support swivels 14 and 16 on the draft line or line of thrust as the lure is pulled through the water.

The lure body and especially its vanes, can be colored or otherwise ornamented. One color scheme would have vane 28 provided with red or yellow sides with vanes 26 and 30 all white and vane 32 some other color, for example red or yellow. Stripes could be adopted as a surface ornamentation and in order to accomplish the illusionary effects that were described previously.

In Figures 4–6 lure 50 represents a further modification of the invention. Leader 12a is attached to swivel 14a and this connects to eye 46a of lure body 18a. The lure body 18a is partially enclosed in open ended tube 34a and has an aft eye 44a to which the full 360° fisherman's swivel 52 is secured. The forward unit of lure 50 is the same as the unit constructed of the lure body and its tube of Figure 1. However, instead of having hook 20 attached to the aft swivel, lure 50 has a trailing unit 54 that is very much like the unit which it follows. The only distinction between the two lures, aside from possible variations in surface ornamentations, is the direction of curvature of the vanes 56. They are preferably curved in a direction opposite to the direction of curvature (longitudinally) of the vanes of the forward unit. This will cause the trailing unit of lure 50 to rotate in a direction opposite to the direction of rotation of the leading unit. The presence of full 360° swivel 52 is emphasized. The units are capable of articulation and of practically complete freedom for rotation independent of each other and about any axis that either of the units of lure 50 may assume. The units of lure 50 need not be coaxial and the only influence that one has on the other insofar as rotation is concerned, is hydrodynamic.

Unit 54 has an eye 58 at its trailing end to which swivel 60 is secured. This swivel attaches fish hook 62 to the trailing end of the lure 50. The hook 62 merely schematically represents the presence of one or more fish hooks and of any type.

It is understood that various changes may be made in the invention without departing from the following claim. The color scheme could be varied considerably. Moreover, although four vane lures have proved successful, this is only a preferred arrangement. A lesser or greater number of vanes could be used.

What is claimed as new is as follows:

A reversible spinning fish lure comprising: an elongated core, spiral vanes integral with said core and extending from end to end thereof, said vanes including outwardly convergent ends, a transparent, cylindrical tube of uniform diameter throughout its length fixed on the free longitudinal edges of the vanes and terminating flush with the ends thereof, stationary screw eyes mounted on the ends of the core, and swivels connected to said screw eyes for attaching a line and a hook selectively to either end of the lure.

References Cited in the file of this patent

UNITED STATES PATENTS

| | | |
|---|---|---|
| 779,744 | Shakespeare | Jan. 10, 1905 |
| 849,743 | Martin | Apr. 9, 1907 |
| 2,517,620 | Anderson | Aug. 8, 1950 |
| 2,796,694 | Turner | June 25, 1957 |
| 2,817,180 | Thomas | Dec. 24, 1957 |

FOREIGN PATENTS

| | | |
|---|---|---|
| 612,352 | France | July 31, 1926 |